(12) United States Patent
Gundrum

(10) Patent No.: US 6,619,113 B1
(45) Date of Patent: Sep. 16, 2003

(54) WIND DIRECTION DETECTING APPARATUS

(76) Inventor: John Gundrum, 1008 McDaniel St., Sun City Center, FL (US) 33573

( * ) Notice: Subject to any disclaimer, the term of this patent is extended or adjusted under 35 U.S.C. 154(b) by 26 days.

(21) Appl. No.: 09/873,083

(22) Filed: Jun. 1, 2001

Related U.S. Application Data

(60) Provisional application No. 60/249,890, filed on Nov. 17, 2000.

(51) Int. Cl.[7] ............................ G01P 13/00; G01W 1/00
(52) U.S. Cl. .................................. 73/170.05; 73/170.01
(58) Field of Search .......................... 73/170.01, 170.07, 73/170.11, 170.05

(56) References Cited

U.S. PATENT DOCUMENTS

| | | | |
|---|---|---|---|
| 4,136,394 A | 1/1979 | Jones et al. | 364/561 |
| 4,719,798 A | 1/1988 | Orkin | 73/189 |
| 4,831,998 A * | 5/1989 | Maguire, III | 124/50 |
| 4,864,854 A | 9/1989 | vanLeemput | 73/189 |
| 5,540,181 A | 7/1996 | Pearce | 116/173 |
| 5,734,102 A | 3/1998 | Stevens | 73/170.05 |
| 5,791,328 A * | 8/1998 | Alexander | 124/76 |

* cited by examiner

Primary Examiner—Hezron Williams
Assistant Examiner—Andre Allen
(74) Attorney, Agent, or Firm—Kramer & Associates, P.C.

(57) ABSTRACT

A device for allowing a golfer to determine the wind speed and direction above tree top level while playing golf. The device includes a projecting mechanism and a number of light weight wind detecting pellets. The projecting mechanism projects the light weight wind detecting pellets to a height above the tree tops so that the golfer can observe the reaction of the pellets to the wind conditions at that particular height.

15 Claims, 2 Drawing Sheets

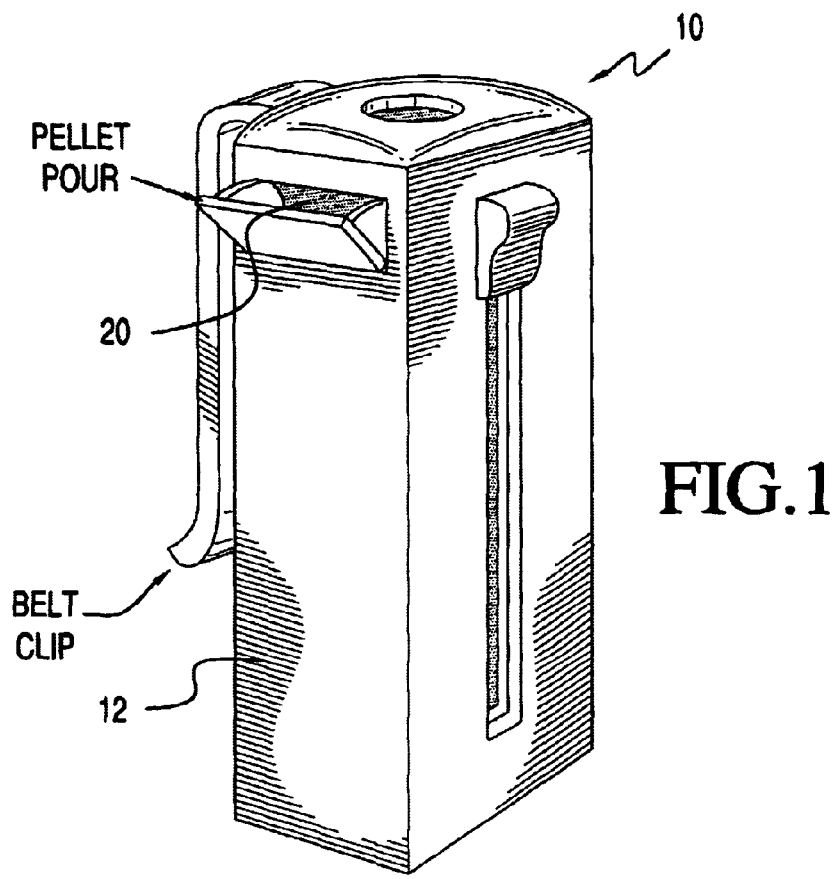
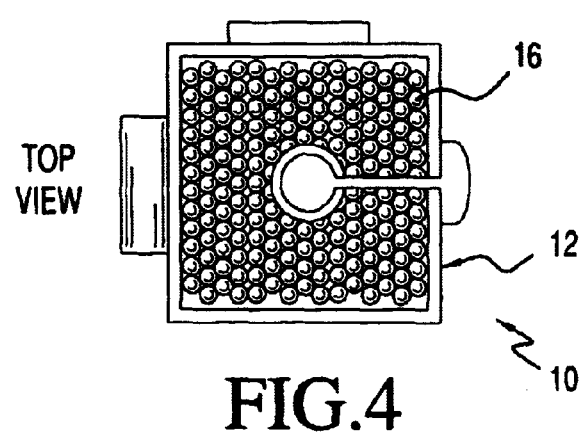

WIND DIRECTION DETECTING APPARATUS

This application claims the benefit provisional application Ser. No. 60/249,890, filed Nov. 17, 2000.

TECHNICAL FIELD

The present invention relates to golf accessories and more particularly to wind direction detecting mechanism that includes a housing having a chamber provided therein for holding a quantity of light weight wind detecting pellets that are fed onto a spring loaded pellet shooting mechanism when the spring loaded pellet shooting mechanism is pushed down by the thumb of the user; when the user releases the spring loaded pellet shooting mechanism the light weight wind direction detecting pellets are propelled to a height above the level of the trees so that a golfer or the like can accurately determine the wind conditions above the trees where the golf ball will actually fly; the housing having a opening through which additional light weight wind detecting pellets can be added as needed.

BACKGROUND OF INVENTION

It is often difficult for golfers and the like to accurately gauge the wind direction and speed of the air movement above the treetop level when playing golf. It would be a benefit, therefore, to have a device which would allow the golfer to determine the wind speed and direction above the treetop level by projecting light weight pellets above the tree top level which would be blown in a direction and in a corresponding wind speed to provide the golfer with the information desired.

SUMMARY OF INVENTION

It is thus an object of the invention to provide a wind direction detecting mechanism that includes a housing having a chamber provided therein for holding a quantity of wind light weight wind detecting pellets that are fed onto a spring loaded pellet shooting mechanism when the spring loaded pellet shooting mechanism is pushed down by the thumb of the user; when the user releases the spring loaded pellet shooting mechanism the light weight wind direction detecting pellets are propelled to a height above the level of the trees so that a golfer or the like can accurately determine the wind conditions above the trees where the golf ball will actually fly; the housing having a opening through which additional light weight wind detecting pellets can be added as needed.

Accordingly, a wind direction detecting mechanism is provided. The wind direction detecting mechanism includes a housing having a chamber provided therein for holding a quantity of wind light weight wind detecting pellets that are fed onto a spring loaded pellet shooting mechanism when the spring loaded pellet shooting mechanism is pushed down by the thumb of the user; when the user releases the spring loaded pellet shooting mechanism the light weight wind direction detecting pellets are propelled to a height above the level of the trees so that a golfer or the like can accurately determine the wind conditions above the trees where the golf ball will actually fly; the housing having a opening through which additional light weight wind detecting pellets can be added as needed.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY EMBODIMENTS

Figure 2:
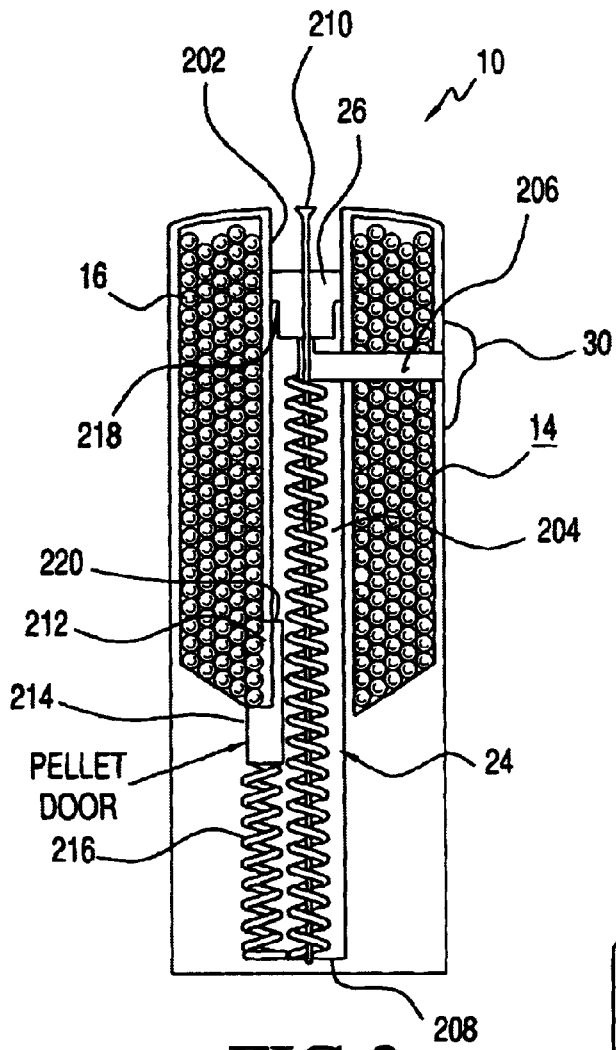
FIG. 2 is a cut away view of the wind detector mechanism of the present invention.

FIGS. 1 through 4 show various aspects of the exemplary embodiment of the wind direction detecting mechanism of the present invention generally designated 10. Wind direction detecting mechanism includes a housing 12 having a chamber 14 within which a number of light weight pellets 16 are positioned and held prior to use. Pellet 16 are inserted into cavity 14 through a fill opening 20 on the side of housing 12.

As shown in FIGS. 1–4, the housing 12 includes a plurality of sidewalls 102, 104, 106, and 108 connecting a top surface 110 and a bottom surface 112. An opening 114 is defined within top surface 112 and communicates with an interior of the housing defined between top surface 110, bottom surface 112, and sidewalls 102, 104, 106, and 108. A tubular wall 202 extends from opening 114 into the interior of the housing defining a centrally located passageway 204 extending from opening 114 to a point located within the interior of housing 10. Chamber 14 is defined between sidewalls 102, 104, 106, 108 and the tubular wall 202. Fill opening 20 formed within sidewall 102 communicates with chamber 14 and enables a user to fill chamber 14 with pellets 16 by pouring them in fill opening 20. This operation may be aided with the use of a pour spout 116 that is connected to sidewall 102 in a manner such that pour spout 116 may be moved to a position flush with sidewall 102 to thereby close fill opening 20. A belt clip 120 may be provided such that a user may attach housing 10 to an article of clothing.

As seen in FIG. 2, an exit opening 212 is defined within tubular wall 204 at a distal point thereof and connects passageway 204 to chamber 14. A door 214 is biased to a first upward position by a spring 216 and configured to create a barrier between the passageway 204 and chamber 14 by effectively closing opening 212. Door 214 includes an engaging surface 220 that is disposed radially inward with respect to tubular wall 204.

Figure 3:
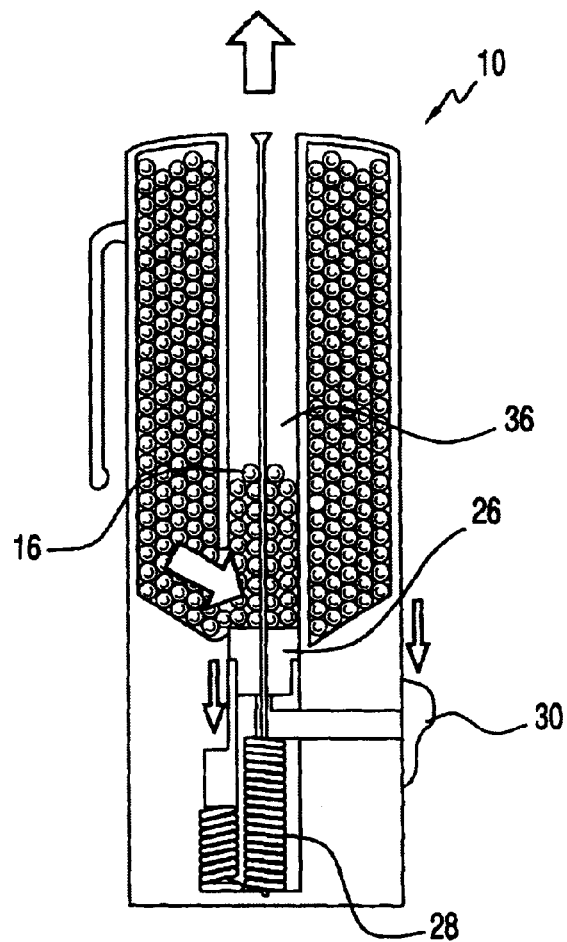
FIG. 3 is a second cut away view of the wind direction detector mechanism.

Disposed within passageway 204 is a propelling mechanism 24 that includes a platform 26, a spring 28, a sliding mechanism 206, and an actuator 30. Platform 24 includes an engaging surface 218 that is configured to engage engaging surface 220 upon actuation of propelling mechanism 24. Spring 28 has a first end attached to sliding mechanism 206 and a second end attached to a bottom surface 208 of passageway 204. As shown in FIGS. 2 and 3, a guiding post 210 engages sliding mechanism 24 and platform 26 and is disposed within the interior of spring 28. Guiding post 210 extends substantially the entire length of passageway 204 and is attached to bottom surface 208. Spring 28 is configured to bias platform 26 to a first upward position, as shown in FIG. 2. A guiding slot 1 18 is formed in sidewall 104 and disposed intermediate sliding mechanism 206 and actuator 30. Guiding slot 118 is configured to engage sliding mechanism 24 upon actuation of propelling mechanism 24. Propelling mechanism 24 is configured to translate platform 26 in a reciprocating motion within passageway 204. The operation of propelling mechanism 24 will be discussed in greater detail below.

During operation of the present invention, a user will fill chamber 14 with pellets 16 by pouring pellets 16 through fill opening 20. This may be accomplished with the aid of pour spout 116 although a pouring aid is not a necessity. At this point, door 214 is biased to a closed position, as seen in FIG. 2 such that pellets 16 are trapped within chamber 14 and prohibited from escaping into passageway 204. As the user exerts a downward force upon actuator 30 with a thumb, sliding mechanism 206 is moves in a downward direction compressing spring 28. Due to this downward force, platform 26 is also moved in a downward direction within passageway 204. At this point, guiding post 210 exerts a steering force upon platform 26 such that platform 26 moves in the downward direction in a substantially straight line without tilting to one side or the other and causing undue frictional forces between tubular wall 202 and platform 26. Guiding slot 118 working in conjunction with guiding post 210 prevents undue rotational forces acting upon actuator 30 and sliding mechanism 206 by allowing sliding mechanism to travel in the upward and downward directions only in a controlled and efficient manner.

As the platform is moved in to a further downward position within passageway 204, engaging surface 218 of platform 26 engages engaging surface 220 of door 214 in a manner such that spring 216 is compressed and door 214 is moved in a downward direction due to the downward force placed upon door 214 by platform 216. At this point, opening 212 is partially unblocked such that chamber 14 and passageway 204 are connected via opening 212. As actuator 30 is moved to a fully downward position, springs 216 and 28 are further compressed and platform 26 and door 214 are moved to a second position, as shown in FIG. 3. At this point, opening 212 is fully uncovered such that pellets 16 are allowed to move through opening 212 into passageway 204 to be supported by platform 26. Once the user releases actuator 30, the compressed force of spring 28 forces platform 26 to move rapidly in an upward direction within passageway 204 causing pellets 16 that have migrated into passageway 204 to be translated with platform 26 in this rapid manner. Due to this strong upward force exerted on the platform supported pellets 16, pellets 16 are ejected out of opening 114 and out of housing 10 into the air preferably to a height at which the user can then watch pellets 16 interact with the wind to determine wind direction in the particular area of interest. Additionally, as platform 26 is thrust in this upward direction, engaging surface 218 of platform 26 disengages engaging surface 220 of door 214 allowing spring 216 to move door in an upward direction to engage opening 212. Therefore, pellets 16 that have not migrated into passageway 204 will remain in chamber 14 until the user actuates propelling mechanism 24 at a later point in time.

It is noted that the embodiment of the wind direction detecting mechanism described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

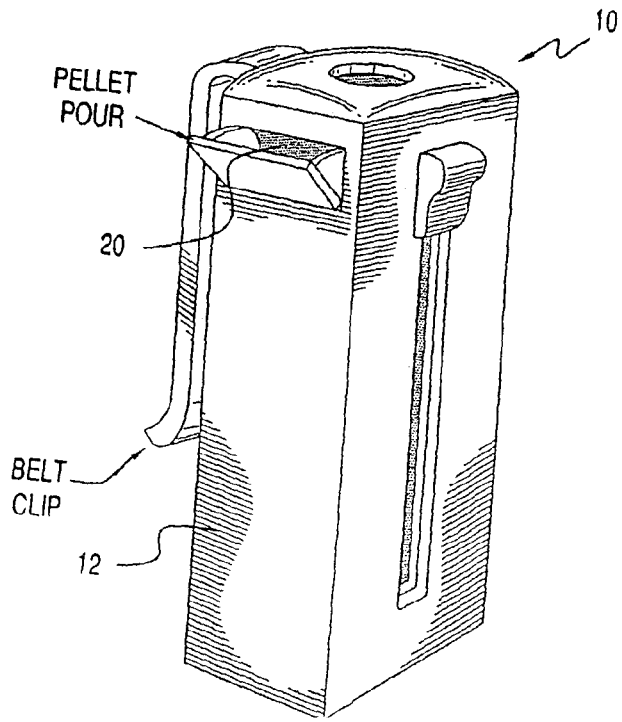

What is claimed is:

1. A wind direction detecting apparatus comprising:
   a. a housing having an interior defined between a top surface, a bottom surface, and a plurality of side surfaces connecting the top and bottom surfaces;
   b. a chamber defined within the housing, the chamber configured to hold multiple light-weight pellets;
   c. a passageway formed within the housing that extends from an opening defined within the top surface to a depth within the housing interior; and
   d. a propelling mechanism disposed within said passageway, the propelling mechanism including a platform configured to propel multiple light-weight pellets out of the opening;
   said light-weight pellets configured to be propelled into air and moved by the wind due to their weight so the wind direction can be visually detected.

2. The apparatus of claim 1 wherein the chamber is defined between the side surfaces and the passageway.

3. The apparatus of claim 2 further comprising an exit opening disposed between the chamber and the passageway.

4. The apparatus of claim 1 wherein the propelling mechanism further comprises a platform spring configured to bias the platform to a first platform position and propel the platform through the passageway from a second platform position.

5. The apparatus of claim 4 further comprising a slide mechanism attached to the platform wherein the slide mechanism is configured to compress the platform spring when moved in a downwardly direction.

6. The apparatus of claim 5 further comprising an actuator attached to the slide mechanism wherein the actuator is configured to move the slide mechanism in a downwardly direction.

7. The apparatus of claim 6 further comprising a guide slot in a side surface of the housing, the guide slot disposed intermediate the actuator and the slide mechanism.

8. The apparatus of claim 4 further comprising a door movable between a first position and a second position and configured to fully engage the exit opening in the first door position and fully disengage the exit opening in the second door position.

9. The apparatus of claim 8 further comprising a door spring attached to the door, the door spring configured to engage the door such that the closure mechanism is biased to the first door position.

10. The apparatus of claim 8 wherein the door is configured to engage the platform and be moved to the second door position upon movement of the platform to the second platform position.

11. The apparatus of claim 1 further comprising a belt clip attached to the sidewall and configured to engage an article of clothing.

12. The apparatus of claim 1 further comprising a fill opening formed within the housing and configured to connect the chamber with an exterior of the housing.

13. The apparatus of claim 1 wherein a guiding post is disposed in the passageway and configured to engage the platform.

14. A wind direction detecting apparatus, comprising:
   a. a housing having an interior defined between a top surface, a bottom surface, and a plurality of side surfaces connecting the top and bottom surfaces;
   b. a chamber defined within the housing, the chamber configured to hold multiple light-weight pellets;
   c. a fill opening formed within the sidewall and configured to communicate with the chamber;

d. a passageway formed within the housing that extends from an opening defined within the top surface to a depth within the housing interior;
e. a propelling mechanism disposed within said passageway, the propelling mechanism having a platform configured to simultaneously propel multiple lightweight pellets out of the opening;
f. a slide mechanism attached to the platform;
g. a first spring attached to the slide mechanism;
h. an exit opening formed intermediate the chamber and the passageway;
i. a spring biased door configured to engage the exit opening; and
j. an actuator configured to engage slide mechanism;

said light-weight pellets configured to be propelled into air and moved by the wind due to their weight so the wind direction can be visually detected.

15. A method of detecting wind direction, comprising the steps of:

providing an apparatus containing light-weight pellets and a propelling mechanism configured to propel the pellets;

actuating the mechanism to propel the pellets into the air; and visually detecting the wind direction due to the movement of the pellets by the wind.

* * * * *

UNITED STATES PATENT AND TRADEMARK OFFICE
CERTIFICATE OF CORRECTION

PATENT NO. : 6,619,113 B1
DATED : September 16, 2003
INVENTOR(S) : John Gundrum

It is certified that error appears in the above-identified patent and that said Letters Patent is hereby corrected as shown below:

The title page, showing an illustrative figure, should be deleted and substitute therefor the attached title page.

Figure 1:
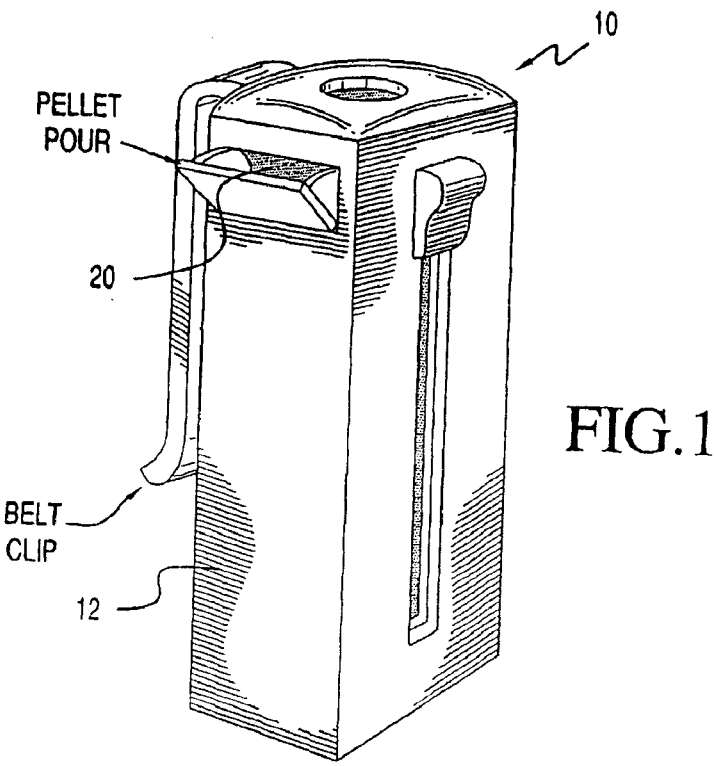
FIG. 1 is a perspective view of an exemplary embodiment of the wind direction detecting mechanism of the present invention.
Figure 4:
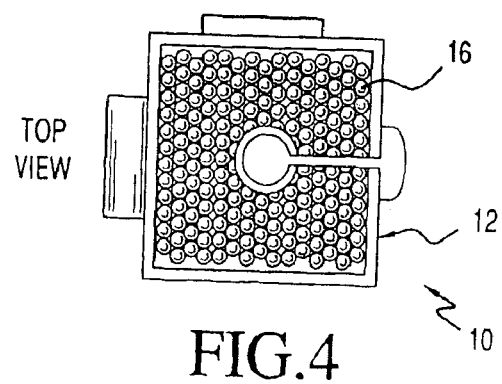
FIG. 4 is a cut away top view of the wind direction detector mechanism of the present invention.

Delete Figures 1 and 4, and substitute therefor the Figures 1 and 4, as shown on the attached pages.

Signed and Sealed this

Twenty-third Day of December, 2003

JAMES E. ROGAN
*Director of the United States Patent and Trademark Office*

United States Patent
Gundrum

(10) Patent No.: US 6,619,113 B1
(45) Date of Patent: Sep. 16, 2003

(54) WIND DIRECTION DETECTING APPARATUS

(76) Inventor: John Gundrum, 1008 McDaniel St., Sun City Center, FL (US) 33573

( * ) Notice: Subject to any disclaimer, the term of this patent is extended or adjusted under 35 U.S.C. 154(b) by 26 days.

(21) Appl. No.: 09/873,083

(22) Filed: Jun. 1, 2001

Related U.S. Application Data

(60) Provisional application No. 60/249,890, filed on Nov. 17, 2000.

(51) Int. Cl.[7] .............. G01P 13/00; G01W 1/00
(52) U.S. Cl. .................. 73/170.05; 73/170.01
(58) Field of Search .............. 73/170.01, 170.07, 73/170.11, 170.05

(56) References Cited

U.S. PATENT DOCUMENTS

| | | | |
|---|---|---|---|
| 4,136,394 A | 1/1979 | Jones et al. | 364/561 |
| 4,719,798 A | 1/1988 | Orkin | 73/189 |
| 4,831,998 A * | 5/1989 | Maguire, III | 124/50 |
| 4,864,854 A | 9/1989 | vanLeemput | 73/189 |
| 5,540,181 A | 7/1996 | Pearce | 116/173 |
| 5,734,102 A | 3/1998 | Stevens | 73/170.05 |
| 5,791,328 A * | 8/1998 | Alexander | 124/76 |

* cited by examiner

*Primary Examiner*—Hezron Williams
*Assistant Examiner*—Andre Allen
(74) *Attorney, Agent, or Firm*—Kramer & Associates, P.C.

(57) ABSTRACT

A device for allowing a golfer to determine the wind speed and direction above tree top level while playing golf. The device includes a projecting mechanism and a number of light weight wind detecting pellets. The projecting mechanism projects the light weight wind detecting pellets to a height above the tree tops so that the golfer can observe the reaction of the pellets to the wind conditions at that particular height.

15 Claims, 2 Drawing Sheets